United States Patent
Listle et al.

(10) Patent No.: US 7,499,796 B2
(45) Date of Patent: Mar. 3, 2009

(54) DRIVER INFORMATION DEVICE

(75) Inventors: Holger Listle, Lamspringe (DE); Andre Barkowski, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 10/600,894

(22) Filed: Jun. 20, 2003

(65) Prior Publication Data

US 2004/0098195 A1 May 20, 2004

(30) Foreign Application Priority Data

Jul. 6, 2002 (DE) ................ 102 30 479

(51) Int. Cl.
*G01C 21/00* (2006.01)
(52) U.S. Cl. ............ 701/200; 701/208; 701/300; 340/990; 340/995.1; 340/988; 342/205
(58) Field of Classification Search ............ 701/200, 701/208, 211, 212, 300; 340/990, 995, 988; 345/684, 472, 837; 342/205
See application file for complete search history.

(56) References Cited

U.S. PATENT DOCUMENTS

| | | | | |
|---|---|---|---|---|
| 5,283,560 | A * | 2/1994 | Bartlett | 345/729 |
| 6,640,185 | B2 * | 10/2003 | Yokota et al. | 701/208 |
| 2002/0011995 | A1 * | 1/2002 | Sasaki | 345/204 |
| 2002/0130906 | A1 * | 9/2002 | Miyaki | 345/837 |
| 2002/0145632 | A1 * | 10/2002 | Shmueli et al. | 345/835 |
| 2003/0085910 | A1 * | 5/2003 | Noble et al. | 345/660 |

FOREIGN PATENT DOCUMENTS

DE 199 56 112 5/2001

OTHER PUBLICATIONS

Generating Semantic 3D Models of Underground Infrastructure; Mendez, E.; Schall, G.; Havemann, S.; Fellner, D.; Schmalstieg, D.; Junghanns, S.; Computer Graphics and Applications, IEEE; vol. 28, Issue 3, May-Jun. 2008 pp. 48-57; Digital Object Identifier 10.1109/MCG.2008.53.*
Algorithms for cooperative multisensor surveillance; Collins, R.T.; Lipton, A.J.; Fujiyoshi, H.; Kanade, T.; Proceedings of the IEEE; vol. 89, Issue 10, Oct. 2001 pp. 1456-1477; Digital Object Identifier 10.1109/5.959341.*
Software technology for implementing reusable, distributed control systems; Heck, B.S.; Wills, L.M.; Vachtsevanos, G.J.; Control Systems Magazine, IEEE; vol. 23, Issue 1, Feb. 2003 pp. 21-35; Digital Object Identifier 10.1109/MCS.2003.1172827.*

(Continued)

*Primary Examiner*—Cuong H Nguyen
(74) *Attorney, Agent, or Firm*—Kenyon & Kenyon LLP

(57) ABSTRACT

A driver information device with a map display is designed in such a way as to make the map display clear and easy to read. This is achieved, in cases where multiple special objects are situated at one location on the map, through the use of an indicator symbol representing such special objects, with a selection menu for selecting individual special objects, instead of displaying an individual symbol for each one of them.

5 Claims, 2 Drawing Sheets

OTHER PUBLICATIONS

MobiEyes: A Distributed Location Monitoring Service Using Moving Location Queries; Gedik, B.; Ling Liu; Mobile Computing, IEEE Transactions on; vol. 5, Issue 10, Oct. 2006 pp. 1384-1402; Digital Object Identifier 10.1109/TMC.2006.153.*

Issues in symbol design for electronic displays of navigation information; Yeh, M.; Chandra, D.; Digital Avionics Systems Conference, 2004. DASC 04. The 23$^{rd}$; vol. 1, Oct. 24-28, 2004 pp. 5.C.3-5.1-9 vol. 1.*

B. Gedik, K.-L. Wu, P.S. Yu and L. Liu, "Motion Adaptive Indexing for Moving Continual Queries over Moving Objects," Proc. ACM Conf. Information and Knowledge Management, 2004.*

Optimization of Sequential Paging in Movement-Based Location Management Based on Movement Statistics; Yi-hua Zhu; Leung, V.C.M.; Vehicular Technology, IEEE Transactions on; vol. 56, Issue 2, Mar. 2007 pp. 955-964; Digital Object Identifier 10.1109/TVT.2007.891403.*

A multi-layer location management scheme that bridges the best static scheme and the best dynamic scheme; Guangbin Fan; Jingyuan Zhang; Mobile Data Management, 2004. Proceedings. 2004 IEEE International Conference on; 2004 pp. 125-132; Digital Object Identifier 10.1109/MDM.2004.1263050.*

* cited by examiner

DRIVER INFORMATION DEVICE

BACKGROUND INFORMATION

German Patent Application No. 199 56 112 describes a driver information device in the form of a navigation system, in which a simplified selection of objects of interest takes place by using a selection list. For this purpose, a map and the selection list are displayed simultaneously on the display unit. Symbols for the objects displayed and described in the list are superimposed on the map. With this device, however, the viewer has to match the superimposed object with a list entry himself. Furthermore, the practice of superimposing symbols directly at the location of the object to which the symbol relates onto a map is also known. However, especially in densely built-up areas or at low resolution, these objects partially or, at worst, completely obscure each other so that the viewer is unable to see the relevant symbol when looking at the map. This may cause the viewer to miss important objects. In addition, the immediately adjacent positioning and partial or complete obscuring of symbols makes selection of an object located in close proximity to other objects difficult, where such a selection is made, for example, by using crosshairs, by touching a touch-screen surface, or via a screen marker.

SUMMARY OF THE INVENTION

The driver information device according to the present invention has the advantage that, instead of multiple objects being located in one place on the map, these symbols are not themselves displayed in that location, but are replaced by an indicator symbol representing all of them. By selecting this indicator symbol, the user is able to generate a display of symbols, and preferably also a description of the special objects, in a selection menu. The user thereby receives easily legible information about the multiple special objects, the indicator symbol being preferably superimposed on the map at the location where the special objects are actually located, or at one that is in close proximity to the special objects. This occurs in particular in cases where the symbols for multiple objects in one location would overlap so as to at least partially, or even totally, obscure each other, even if the particular special objects are only very close to each other, and not in the exact same location.

A special advantage is the superimposition of the selection menu on the map, preferably in the form of a list, in particular by using a semi-transparent window, in such a way that the map continues to remain essentially visible to the user. Furthermore, the matching of objects to symbols is made easier by the fact that the indicator symbol continues to be displayed unchanged in its location even after it has been selected, while being either directly connected with the selection menu or embedded in it.

A further advantage is the ability to enter one of the special objects as a destination into the driver information device by making a selection or to generate the display of further information by making a selection. This simplifies the entry of the destination and the selection of information.

Another advantage is that the user is able to draw conclusions regarding the nature of at least one of the objects in this location from the color of the indicator symbol. Color may thus be used to indicate, for example, hospitals, restaurants or hotels separately. This makes it possible to prioritize individual facilities in order to determine which color shall appear if multiple objects, to which such a special color is allocated, are present in the location indicated, or within a given radius from this spot.

DETAILED DESCRIPTION

The driver information device according to the present invention may be used for any vehicle. It may also be installed independently of any vehicle in a computer unit. In the following, the driver information device according to the present invention is described using the example of a driver information device designed as a navigation device and built into an automobile. In general, there is only space for a small viewing screen in an automobile, and the application of the present invention thus enables optimum utilization of this limited screen area.

Figure 1:
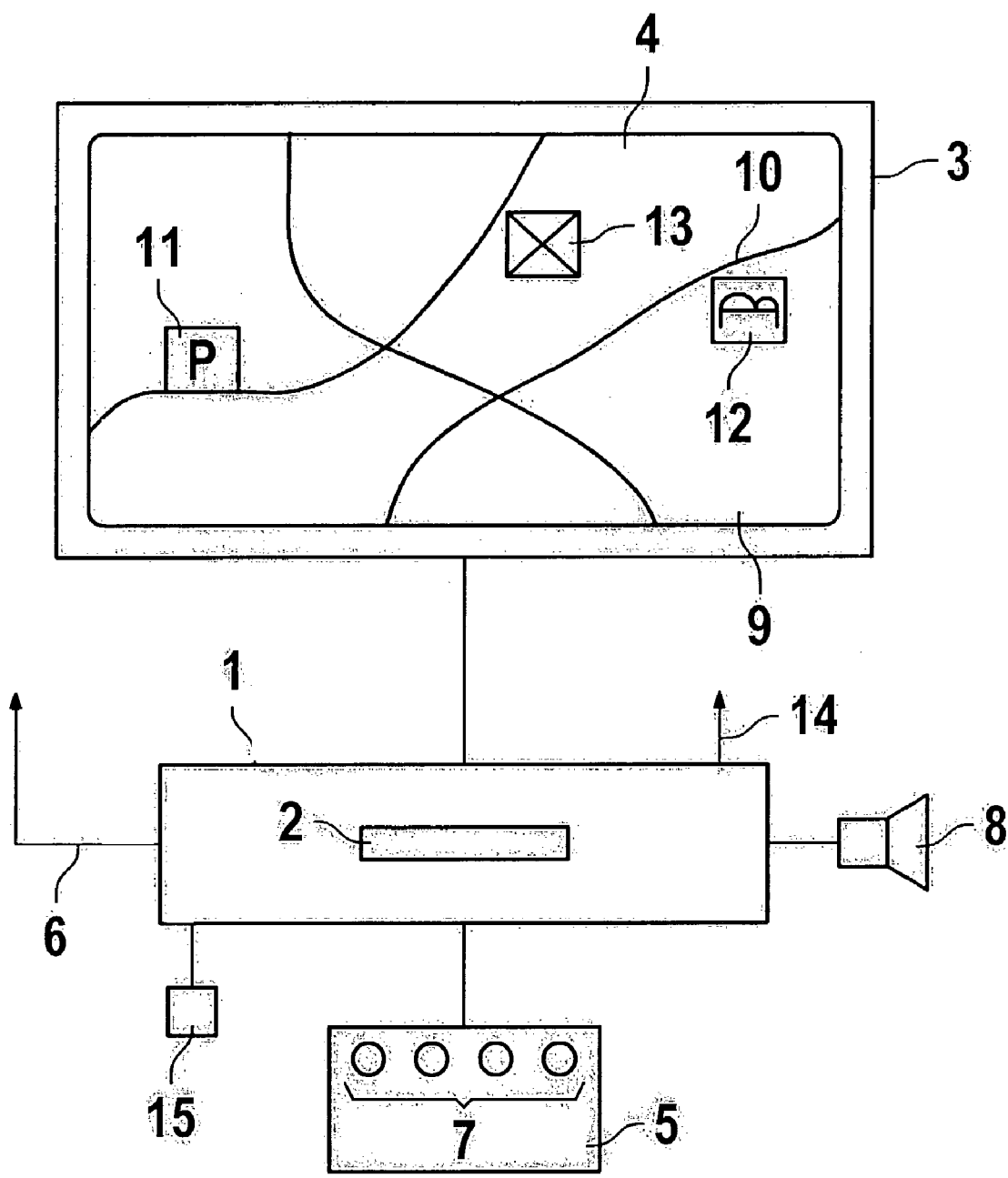
FIG. 1 shows a driver information device according to the present invention.

FIG. 1 shows a navigation device 1 having a computer unit 2, connected to which is a display unit 3 having a viewing screen 4. Navigation device 1 includes in particular a positioning device 6 that determines, preferably through a satellite positioning system such as GPS, an instantaneous position of a vehicle. Via operating elements 7, which are positioned on an operating unit 5 and may be designed as pushbuttons, as a rocker switch, or as a dial, a destination may be entered into navigation device 1. Based on the instantaneous position of the vehicle as determined by positioning device 6, computer unit 2 determines a route leading to the destination entered. Through a loudspeaker 8, driving instructions are issued to the driver. Driving instructions may also be displayed on viewing screen 4. Furthermore, navigation device 1 has memory 15 where a map image is stored, which will be displayed on viewing screen 4. Also stored in memory 15 are the information relating to the special objects as well as the symbols and names of these objects in the form of graphics and/or text.

Viewing screen 4 also displays a map image 9 for driver orientation and, in particular, for entering the destination. The map section displayed may be selected either via operating elements 7, or specified automatically by computer unit 2 based on the instantaneous vehicle position as determined via positioning device 6. Map display 9 contains roads 10. In addition, the map contains multiple symbols informing the driver about special objects, POI (Points of Interest), the corresponding symbols being displayed on the map at the position of each special object. The special objects are, for example, places of interest, restaurants, hotels, government offices, filling stations, rest areas, or parking lots. In the exemplary embodiment shown, a parking lot symbol 11 is displayed on a street. At a different location in the map display 9, a bed is displayed as a hotel symbol 12. In addition, the map also displays an indicator symbol 13 advising the user that a number of special objects are located at the position of indicator symbol 13. For entering a destination, one of symbols 11, 12, 13 may be selected. Selection takes place via operating elements 7. In a special embodiment of the present invention, viewing screen 4 may be designed as a touch-sensitive screen surface so that, by touching viewing screen 4 where symbols 11, 12, 13 are located, this symbol is also selected. Depending on the embodiment and the settings of navigation device 1, selecting a symbol may result in its instantaneous location being entered as a destination. In another embodiment of the present invention, selection may initially trigger the display of further information relating to the special object. For example, together with hotel symbol 12, vacancies, category or prices may be displayed for the hotel. In a preferred version, navigation device 1 is equipped for this purpose with a wireless communication interface 14 that will enable access to further information.

In order to draw attention to special facilities, indicator symbol 13 may, for example, be colored red if there is a hospital at this location, blue if there is a hotel, but no hospital, at this location, and green if there is a restaurant, but neither a hotel nor a hospital at this location.

Figure 2:
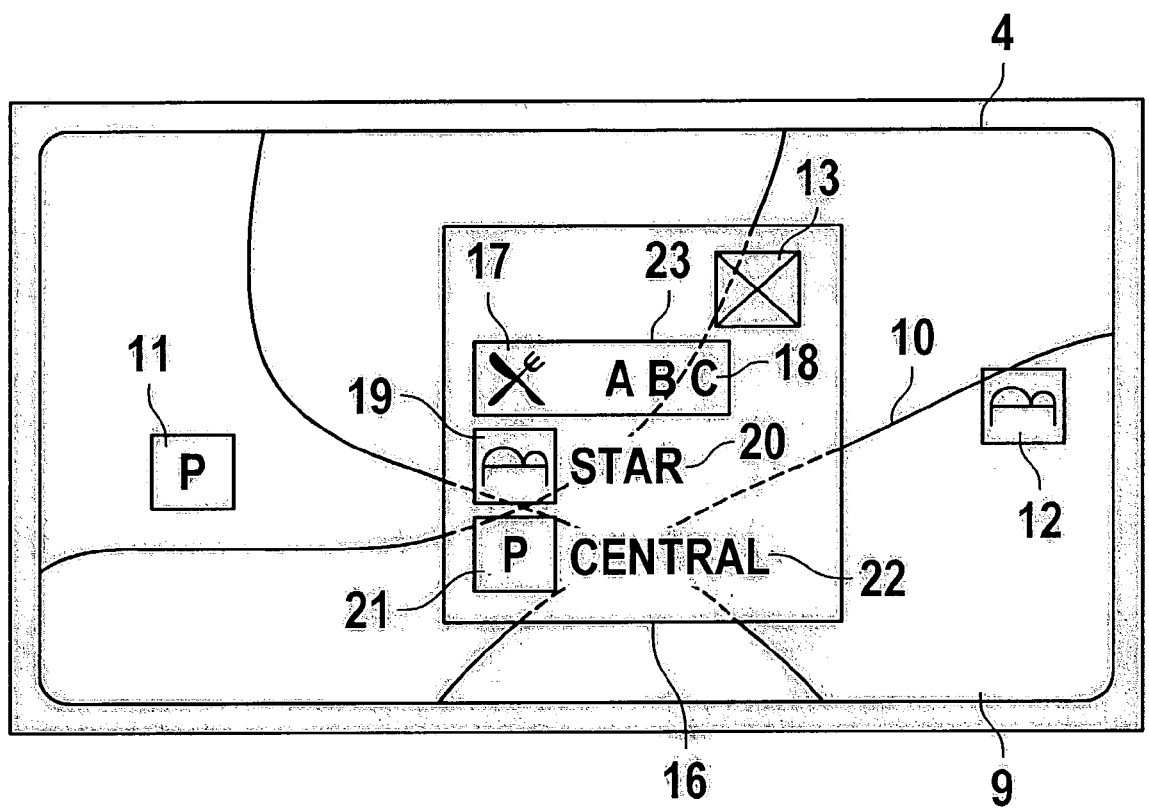
FIG. 2 shows the display of data in a driver information device according to the present invention after the indicator symbol has been selected.

If indicator symbol 13 is selected, this location is initially not recorded as a destination, rather there follows the display of a selection menu containing further information, here in the form of a list, as shown in FIG. 2. Preferably, information is displayed as symbols and/or text. In a different embodiment of the present invention it is, for example, also possible to select from a two-dimensional selection box or from a tree structure. Indicator symbol 13 remains displayed unchanged at the same location on the map. A semi-transparent window 16 with a selection menu is superimposed on map display 9 in the vicinity of indicator symbol 13, a gray shading being superimposed on the map in the area of the window 16, for example, so that the map display underneath, although fainter, remains recognizable, while any superimposed information pertaining to the special objects is highlighted in contrast to the map. Accordingly, FIG. 2 shows the roads underneath window 16 as dotted lines. Indicator symbol 13 is embedded in the semi-transparent window 16. Inside the semi-transparent window 16, a restaurant symbol 17 with explanatory text 18 is displayed superimposed. In addition, a hotel symbol 19 with explanatory text 20, e.g., hotel name, is displayed superimposed. Furthermore, a parking lot symbol 21, also with explanatory text 22, is displayed superimposed. In the embodiment shown, a selection frame 23 is positioned around the restaurant symbol 17 with explanatory text 18, e.g., name of restaurant, within the selection menu. By using operating elements 7 or touching the viewing screen 4, selection frame 23 may be moved to the other special objects displayed, in this case the hotel or the parking lot. These may be selected as destinations or, alternatively, further information pertaining to these special objects may be accessed, either to be displayed superimposed in map display 9, or to replace map display 9. When displayed in the form of a list as shown here, symbols as well as explanatory text information are displayed superimposed in the semi-transparent window 16. In contrast, in one of the embodiments not shown in the drawing, superimposed display in the semi-transparent window 16 is limited to either symbols or text information for any one object. In another embodiment, also not shown, the semi-transparent window may be filled with a background that completely covers map display 9. Additional information such as street names or place names may, in addition, be displayed directly in map display 9. In yet another embodiment, it is also possible to superimpose only the corresponding symbols 17, 19, 21 in map display 9 on initial selection of indicator symbol 13, and then to add the text information 18, 20, 22 through subsequent selection of indicator symbol 13.

What is claimed is:

1. A driver information device comprising:
a map display, special objects being represented on the map display by special object symbols, a common indicator symbol in the map display indicating a presence of corresponding multiple special objects one of (a) in one location and (b) within a preselected radius of a location, a selection of the common indicator symbol enabling a display of a selection menu containing information about the corresponding multiple special objects, wherein the selection menu is displayed on the map display;
wherein during the display of the selection menu, the common indicator symbol is displayed at a same location on the map where it was displayed before the display of the selection menu, embedded in the selection menu.

2. The driver information device according to claim 1, wherein during the display of the selection menu, the map display continues to be shown, with the selection menu superimposed on the map display.

3. The driver information device according to claim 1, wherein the selection menu includes a plurality of special object symbols corresponding to the multiple special objects indicated by the common indicator symbol, and wherein a desired special object within the selection menu is one of: a) selected as a desired destination; and b) selected for output of additional information regarding the desired special object.

4. The driver information device according to claim 3, wherein the selection of the desired special object is made using a selection frame within the selection menu.

5. The driver information device according to claim 3, wherein upon a first selection of the common indicator symbol enabling a display of the selection menu, only the special object symbols corresponding to the multiple special objects indicated by the common indicator symbol are superimposed on the map display, and wherein upon a subsequent selection of the common indicator symbol, text data associated with the special object symbols corresponding to the multiple special objects indicated by the common indicator symbol are additionally superimposed on the map display.

\* \* \* \* \*